(12) United States Patent
Joseph et al.

(10) Patent No.: US 7,433,565 B2
(45) Date of Patent: Oct. 7, 2008

(54) SIDE-SCATTERING LIGHT GUIDES

(75) Inventors: Edmond Kenneth Joseph, Burleigh (AU); James Bruce Franklin, Camperdown (AU); Geoffrey Burton Smith, Epping (AU)

(73) Assignee: Poly Optics Australia Pty, Queensland (AU)

( * ) Notice: Subject to any disclaimer, the term of this patent is extended or adjusted under 35 U.S.C. 154(b) by 0 days.

(21) Appl. No.: 10/526,809

(22) PCT Filed: Sep. 8, 2003

(86) PCT No.: PCT/AU03/01173

§ 371 (c)(1),
(2), (4) Date: Sep. 22, 2005

(87) PCT Pub. No.: WO2004/023181

PCT Pub. Date: Mar. 18, 2004

(65) Prior Publication Data

US 2006/0140562 A1    Jun. 29, 2006

(30) Foreign Application Priority Data

Sep. 6, 2002    (AU) .............................. 2002951256

(51) Int. Cl.
G02B 6/02    (2006.01)
(52) U.S. Cl. .................. 385/128; 385/126; 385/127; 385/109; 385/112; 385/123
(58) Field of Classification Search .......... 385/126–128
See application file for complete search history.

(56) References Cited

U.S. PATENT DOCUMENTS

| 3,641,332 | A | * | 2/1972 | Reick et al. ................. 362/582 |
| 4,422,719 | A | * | 12/1983 | Orcutt ......................... 385/123 |
| 4,466,697 | A | * | 8/1984 | Daniel ......................... 385/123 |
| 4,733,929 | A | * | 3/1988 | Brown .......................... 385/31 |
| 4,916,359 | A | * | 4/1990 | Jonsson ....................... 313/489 |
| 5,257,329 | A | * | 10/1993 | Blyler et al. .................. 385/11 |
| 5,937,127 | A | * | 8/1999 | Zarian et al. ................. 385/128 |
| 5,982,969 | A | * | 11/1999 | Sugiyama et al. ........... 385/123 |
| 6,169,836 | B1 | * | 1/2001 | Sugiyama et al. ........... 385/123 |
| 6,714,711 | B1 | * | 3/2004 | Lieberman et al. .......... 385/124 |
| 6,771,866 | B2 | * | 8/2004 | Iimura ......................... 385/128 |
| 6,775,449 | B2 | * | 8/2004 | White .......................... 385/123 |
| 7,010,212 | B2 | * | 3/2006 | Emmons et al. ............. 385/146 |
| 2004/0028369 | A1 | * | 2/2004 | Aylward et al. ............. 385/145 |
| 2005/0141843 | A1 | * | 6/2005 | Warden et al. .............. 385/141 |
| 2006/0153511 | A1 | * | 7/2006 | Franklin et al. ............. 385/123 |

* cited by examiner

*Primary Examiner*—Frank G Font
*Assistant Examiner*—Eric Wong
(74) *Attorney, Agent, or Firm*—Parsons & Goltry; Robert A. Parsons; Michael W. Goltry

(57) ABSTRACT

The invention relates to side-scattering light guides that generally comprise a core of transparent optically homogenous material seeded with diffuser particles. The light guide also comprises an optically transmitting sheath, having a lower refractive index than the core, surrounding and in contact with the sides of the core to prevent any light being transmitted along the core from escaping through the core's sides. In general, the diffuser particles impart only a small deviation to light rays incident upon them, and are distributed to scatter light being transmitted along the core so that at least some of the scattered light exits the sides of the core. A diffusing jacket is arranged to intercept scattered light exiting the sides of the core.

25 Claims, 4 Drawing Sheets

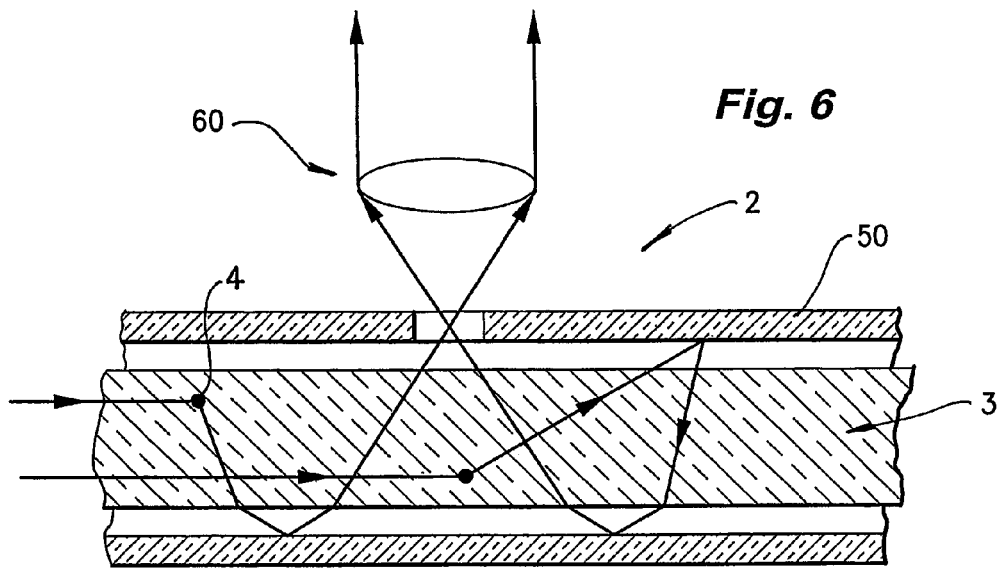
Fig. 6
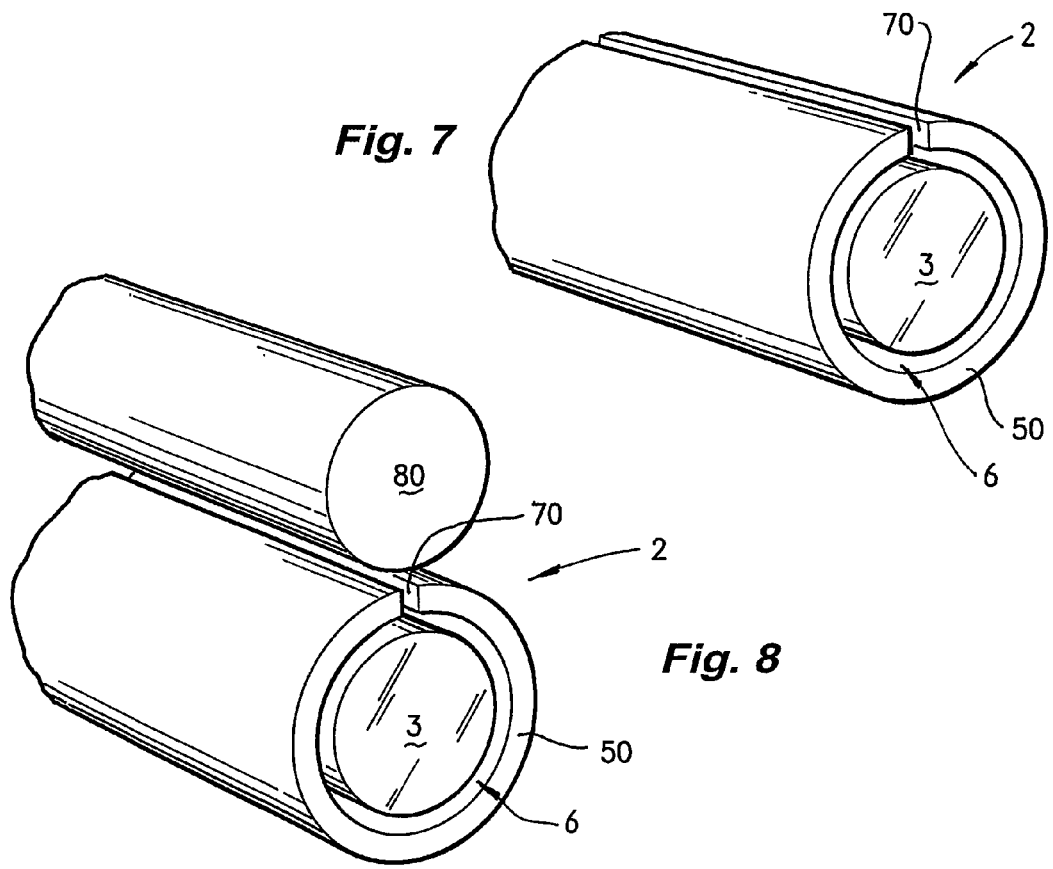
Fig. 7
Fig. 8

SIDE-SCATTERING LIGHT GUIDES

FIELD OF THE INVENTION

The invention relates to side-scattering light guides that comprise a core of transparent optically homogenous material seeded with diffuser particles. In general, the diffuser particles impart only a small deviation to light rays incident upon them, and are distributed to scatter light being transmitted along the core so that at least some of the scattered light exits the sides of the core.

BACKGROUND ART

One type of side-scattering light guide is described in U.S. Pat. No. 6,169,836 (Sugiyama). This patent describes a light guide formed with scattering particles dispersed in the core. The scattering particles have a significantly different refractive index from the core material and therefore cause relatively large scattering angles. The scattered light from this invention has an aesthetically unpleasing appearance.

U.S. Pat. No. 5,542,017 (Koike) describes a side-scattering light guide that has a core containing an irregular structure of regions of small refractive index differences produced from a partly phase separated co-polymer during the polymerization process. Although the scattered light has a more aesthetically pleasing appearance, the process of producing such a light guide is particularly difficult to control.

The Applicant's co-pending International patent application PCT/AU02/00631 describes flexible polymeric side scattering light guides using transparent diffuser particles that are closely refractive index matched with the core bulk material. A refractive index mismatch of a few percent is typical.

Methods of manufacturing side-scattering light guides comprising light scattering additives in the form of diffuser particles are also disclosed in the co-pending International patent application, and its contents are incorporated by reference.

These light guides transport light efficiently in the axial direction, that is from end to end. The fraction of light that is side scattered out in a given length of fibre is determined by the number density of the diffuser particles in the core, but even with densely seeded cores the light guides only glow faintly when viewed from the side, and they give almost no light in the backward direction.

An additional problem is that when viewed from the side, the edges of the guide appear to be much brighter than the centre. The centre also appears to have a slightly "milky" appearance. Many observers perceive the brightness as less than an objective measure would indicate, and the overall impression is aesthetically unsatisfactory.

A further problem is that side-scattered light tends to be emitted in a radially symmetric fashion and a substantial fraction of it may be in unwanted directions.

An additional problem is that for some types of diffuser particles the fraction of light scattered out per meter of fibre varies with the light's wavelength. If white light is used in such fibres the side-emitted light is coloured and the colour changes along the length of the fibre. Colour variation of side-emitted light along a light guide, particularly one using white light, is unacceptable for many applications.

DISCLOSURE OF THE INVENTION

The invention is a side-scattering light guide, comprising a transparent optically homogenous elongate core to transmit light along the core from end to end. An optically transmitting sheath, having a lower refractive index than the core, surrounding and in contact with the sides of the core to prevent the light being transmitted along the core from escaping through the core's sides. Diffuser particles within the core, the diffuser particles being transparent, having a refractive index close to that of the core, high optical transmittance, low back reflectance and low absorbance, and being distributed to scatter light being transmitted along the core so that at least some of the scattered light exits the sides of the core. And, a diffusing jacket arranged to intercept scattered light exiting the sides of the core.

The diffuser particles may have a size substantially greater than the light's average wavelength and a ratio of the diffuser particles' refractive index to that of the of the core which is approximately constant over the light's wavelength range. Cores using this type of diffuser particle have a constancy of side-scattering efficiency with wavelength and hence the light guide has minimal colour variation along its length provided the optical properties of the sheath and jacket are constant over the light's wavelength range.

We may define the refractive index ratio, m, as m=(refractive index of particles)/(refractive index of core)=1+μ. The maximum acceptable variation of μ over the light's wavelength range depends upon the specific use the side-scattering fibre. Applications employing a substantial wavelength range or where widely spaced parts of a fibre can be viewed simultaneously (e.g. the fibre is bent in a loop and crosses itself) require small variations of μ with wavelength. A fractional variation of 10% is acceptable for many applications. Note that if the average value of m is 1.01 then a 10% variation in μ requires 1.0095<m<1.0105−m must be kept constant to within 0.05%. Except for fibre designed for monochromatic sources (such as a single coloured LED's) it preferable that the variation in m over the light's wavelength range is substantially less than 1%.

Such a light guide is able to produce aesthetically pleasing and bright sidelight.

The lower refractive index sheath surrounding said core may be transparent or translucent. An outer layer of the sheath may form the diffusing jacket. The lower refractive index sheath surrounding said core may be formed from a fluropolymer including at least one of: poly-tetrafluorethylene (PTFE); copolymers of polytetrafluoroethene and hexafluoropropylene (FEP); and tetrafluorethylene-perfluoralkoxethylene copolymers (PFE). Preferably the sheath is of PTFE. Alternatively, the sheath may be formed from a silicone polymer including at least one of: flurosilicone polymers; polydimethylsiloxane polymers; and polymethylphenylsiloxane polymers. Alternatively, the sheath may be of free space. Alternatively, the sheath may be volume filled with a gas such as air. Alternatively, the sheath may be a volume filled with a lower refractive index liquid such as water. Preferably the sheath has low absorption.

A rough outer surface of the core may form the diffusing jacket. The rough outer surface may be produced by a high concentration of diffuser particles in the core.

The diffusing jacket may surround part of the core, for instance half the core. The diffusing jacket may be a transmitting diffuser, and it may be formed from a translucent material including one of the translucent grades of polyethylene, PMMA, PTFEPTFE, ABS, PVC or glass. Alternatively, the diffusing jacket may be a transmitting diffuser that is formed from a transparent material with one or more non-smooth surfaces. The surface relief may include roughness, an imposed pattern or other deviations from smoothness. Suitable materials include one of the transparent grades of PMMA, PTFE, ABS, PVC or glass. Alternatively, the diffusing jacket may be a transmitting diffuser, and it may feature one or more non-smooth surface(s) of a translucent material. Alternatively again, the diffuser jacket may be opaque and reflective. Alternatively again, the diffuser jacket may act as both a transmitting diffuser and a reflective diffuser. It may be apertured. Parts of the jacket may be translucent, other parts may be translucent with a degree of diffuse reflectance and other parts may be opaque and diffusely reflective. Preferably, the diffuser jacket has low absorption.

Placing the diffuser jacket external to the low refractive index sheath minimizes backscattering and retains a key advantage of the diffuser particles. Diffusing elements which are in intimate contact with the core usually reduce available illuminating lengths and also may induce backscattering and hence reduce the fraction of light incident on the fibre that can be side-emitted. An opaque and reflective jacket may be apertured, and the apertures may be surrounded by a transmitting diffuser. The aperture may be a longitudinal slit.

The light guide may be rigid, or flexible. Its core may be formed of a polymer, such as acrylic, or glass.

The diffuser particles may be formed of polymer, such as a cross-linked polymer, for instance PMMA, or polystyrene. Alternatively, the diffuser particles may be formed of non-polymeric material, such as glass or quartz.

One or more optical elements may be positioned adjacent a side of the light guide to collect and direct side-scattered light from said side-scattering light guide. The optical element may be a lens, a mirror or a diffractive element.

BRIEF DESCRIPTION OF THE DRAWINGS

Several examples of the invention will now be described with reference to the accompanying drawings, wherein:

FIG. 6 is a longitudinal section through a fifth side-scattering light guide;

FIG. 7 is a pictorial view of a sixth side-scattering light guide;;

FIG. 8 is a pictorial view of the light guide of FIG. 7 having an additional lens;

DETAILED DESCRIPTION OF THE INVENTION

Figure 1:
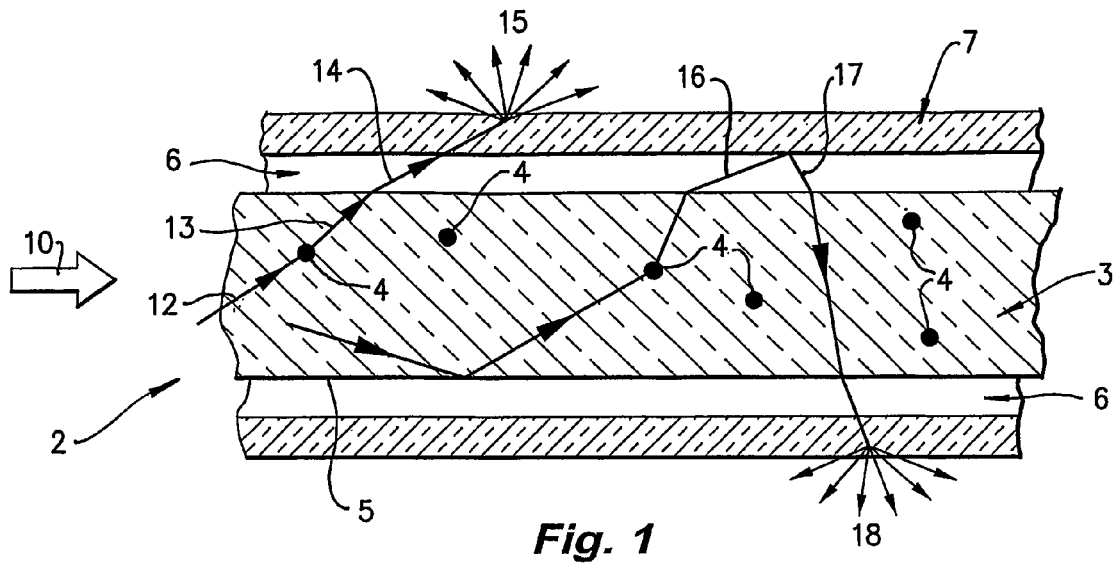
FIG. 1 is a longitudinal section through a first side-scattering light guide.

Referring first to FIG. 1, side-scattering light guide 2 comprises a core 3 seeded with diffuser particles 4. The external surface 5 of core 3 is totally surrounded by, and in contact with, a sheath of lower refractive index material 6. There is also a transmitting diffuser jacket 7.

Core 3 is a polymer formed from a polymer matrix such as Poly-methly methacrylate (PMMA) or a polymerised acrylate mixture consisting primarily of methyl methacrylate (MMA) and allyl diglycol carbonate (CR39). Alternatively, butyl methacrylate (BMA) may be substituted for MMA. In other examples core 3 may be made from polystyrene or glass.

The diffuser particles 4 are formed of a cross-linked polymer, which is capable of being added to the core matrix material without the diffuser particles 4 dissolving, melting or significantly deforming. In most cases the core is made by in situ polymerisation. Silica particles can be used with a glass core. The diffuser particles 4 must have a high transmittance, low back reflectance, low absorbance and a refractive index that is a close match to that of the core 3. This combination of properties allows light transport along the light guide to be highly efficient, and the absorption and back scattering losses are substantially smaller than those of conventional side-emitting light guides.

The external surface 5 of core 3 is totally surrounded and in contact with a layer of air 6.

The diffuser jacket 7 is a translucent diffusing material, for instance polyethylene, PMMA PTFEPTFE-, ABS, PVC, or glass. The material also has high transmittance and low absorbance.

In use light is injected into one end of light guide 2 in the direction shown by arrow 10. Almost all the light is transmitted along the guide within the core 3 and is totally internally reflected when it strikes the external surface 5 of core 3.

Any light rays that strike the external surface 5 of core 3 with an angle (measured with respect to the normal at the surface of core 3) which is less than the critical angle will escape from core 3. Escaping rays of light tend to be emitted strongly in the forward direction indicted by arrow 10.

Occasionally a light ray, such as 12, will strike a diffuser particle 4 and undergo a small deviation, at most a few degrees. After this occurs there is a greater chance that the deviated ray 13 will escape 14. Since ray 12 was initially travelling close to the critical angle and underwent only a small deviation, the angle at which ray 14 exits above the surface is also small. For example, if core 3 has a refractive index of 1.50 and the refractive index of the diffuser particles 4 is 1.0% higher than the core, then the typical exit angle of side-scattered light will be about 8 degrees. Increasing the refractive index mismatch to 2.0% only increases the side-light angle to 17 degrees. Even a refractive index mismatch of 5.0% only yields a sidelight angle of 27 degrees. As a result, side-scattered light appears to be strongly forward focused.

When a light ray, such as 14, escapes core 3 it passes through the air sheath 6 and encounters the jacket of diffusing material 7. In this example, since the jacket is translucent diffusing material, the ray 14 is diffused through it, as illustrated by rays 15. The translucent diffusing material should have the lowest possible absorption to minimise the loss of light.

It is possible that an escaping ray 16 will encounter the diffusing material 7 and be reflected back into the core 3, as shown by ray 17. This ray is likely to pass through the essentially transparent light guide core 3 and escape 18 at the other side. Thus, while a high degree of reflectivity in the diffuser is not ordinarily desirable, it may be acceptable provided the absorption is low.

In general the side scattered light 15 and 18 has a pleasing, bright, substantially uniform appearance.

In FIG. 1 the core 3 is surrounded by a low refractive index sheath 6 of air. However, surrounding the core 3 with a low refractive index sheath 6 of a different low absorption material does not substantially change the results. Transparent PTFE is a preferred material for a sheath 6 not made of air.

In FIG. 1 the diffuser jacket 7 was a translucent material. However, employing a diffuser jacket 7 that is made from a transparent material and uses variations in surface relief (such as roughness, an imposed pattern or other deviations from smoothness) to achieve diffusion does not substantially change the results.

Figure 2:
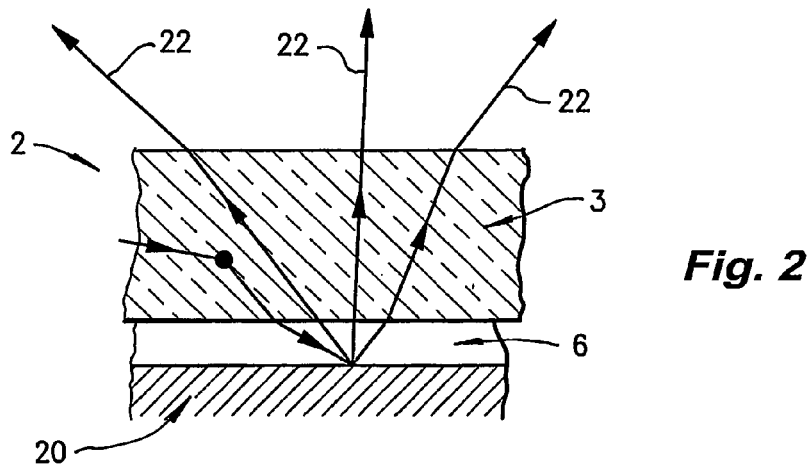
FIG. 2 is a longitudinal section through a second side-scattering light guide.
Figure 3:
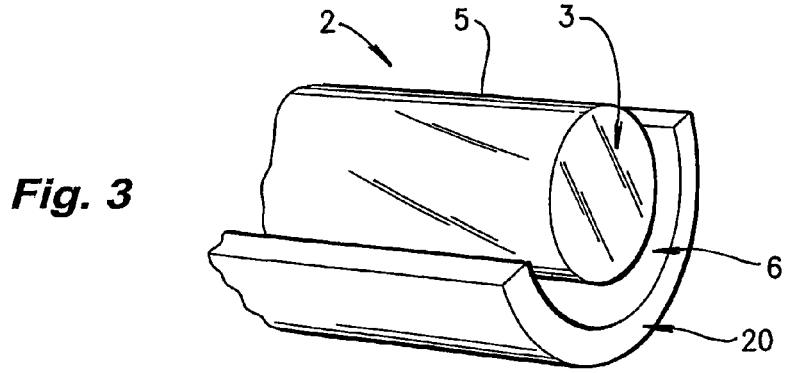
FIG. 3 is a pictorial view of the light guide of FIG. 2.

A second example will now be described with reference to FIGS. 2 and 3. In this example the diffuser jacket 20 is opaque and reflective and extends only around half of the core 3. Light exiting the core 3 in a direction of the opaque reflective diffuser 20 is not transmitted through the diffuser, but is diffused at a wide range of angles, as represented by rays 22 in FIG. 2. This light may be viewed directly or through the essentially transparent light guide core 3. The side-scattered light has a pleasing, bright, substantially uniform appearance. In FIG. 3 the light guide core 3 is half surrounded by a white opaque diffuser 20.

Figure 4:
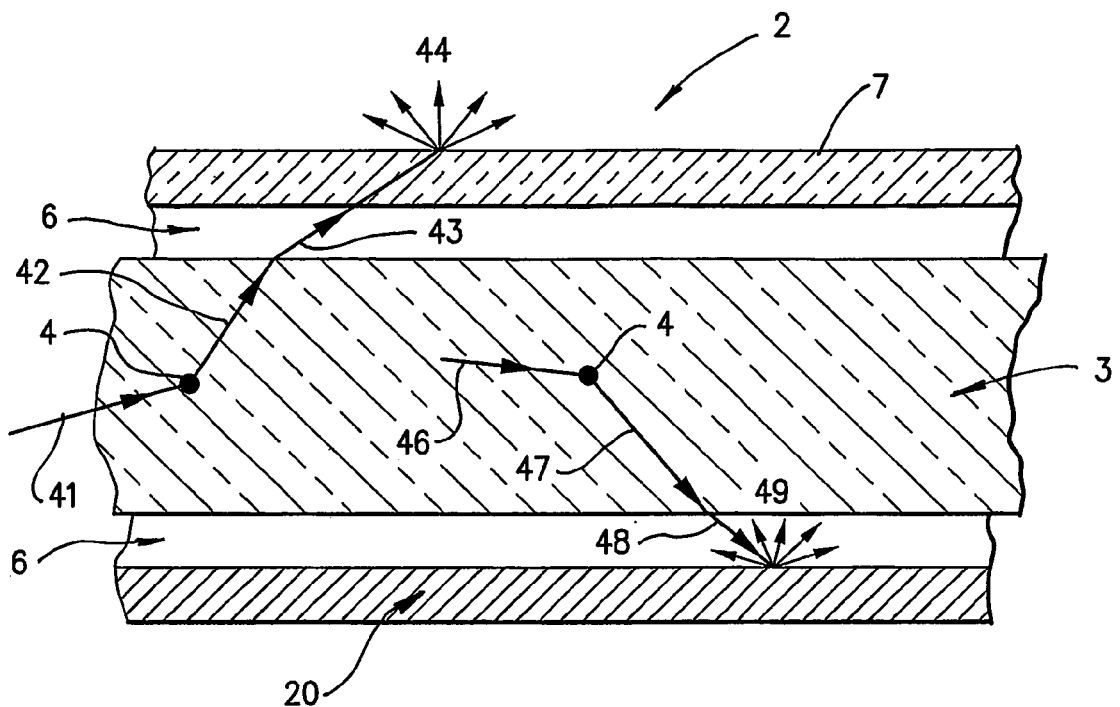
FIG. 4 is a longitudinal section through a third side-scattering light guide.

Note that light escaping the light guide core 3 on the side away from the opaque diffuser 20 will be forward focused. Accordingly, in many applications it may be desirable to simultaneously use a transmitting diffuser 7, as described in the first example, to surround the side of core 3 not surrounded by the opaque diffuser 20. This combination of both diffusers will produce superior quality light than either diffuser alone. This arrangement is illustrated in FIG. 4, where a first ray 41 is seen to be deflected by a diffuser particle 4 and side-scattered 42 through the core 3, then 43 through the sheath 6, before being diffused 44 by transmitting diffuser 7. Another ray 46 also encounters a particle 4 but is side-scattered 47 through the core 3, and through 48 sheath 6 before being diffusely reflected 49. This combination could be extended to applications where side-scattered light is to be emitted from a number of discrete locations along the side-scattering light guide rather than as a continuous linear source. Alternatively, a transmitting diffuser jacket may be used surrounded by an apertured opaque absorbing jacket.

Figure 5:
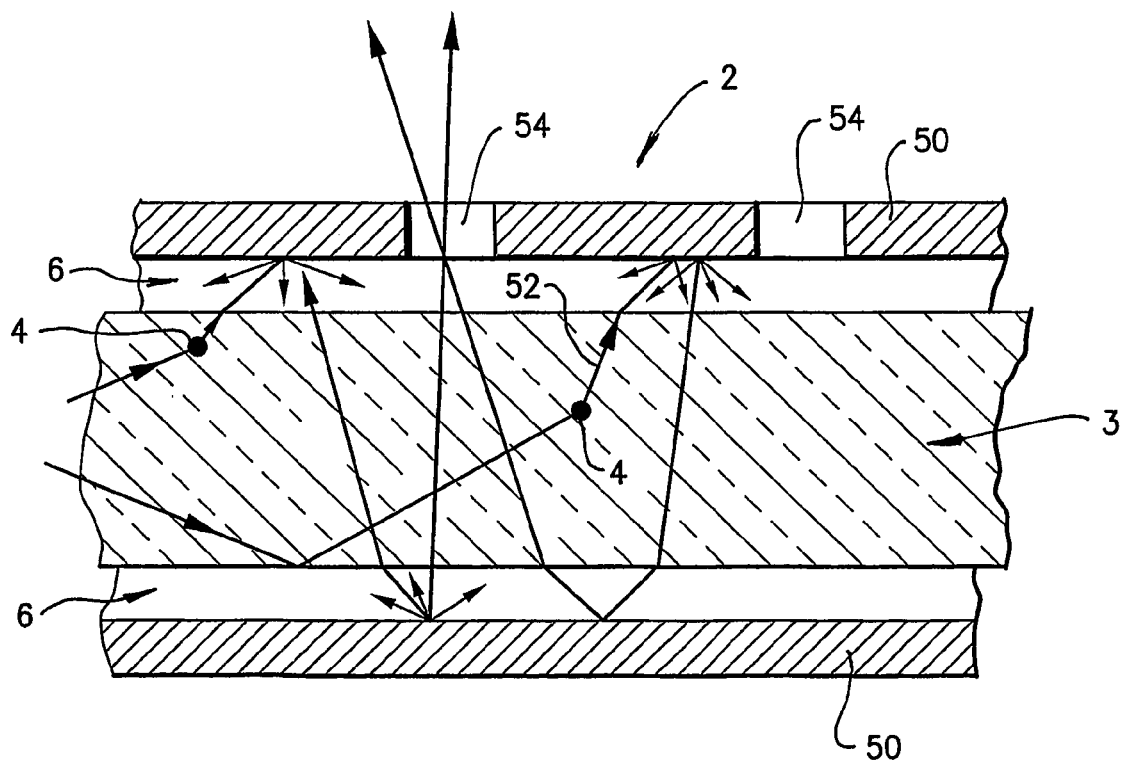
FIG. 5 is a longitudinal section through a fourth side-scattering light guide.

However, the inventors have identified that better results are obtained by using an apertured opaque reflecting diffuser jacket 50, as illustrated in FIG. 5. Once a ray 52 reflects off a wall of the opaque reflecting diffuser jacket 50, it takes on a substantially uniform angular spread. The essentially transparent core 3 will allow this now diffuse light to bounce around inside the system until it either: (i) escapes through an aperture 54 in the diffuser jacket wall (the desired alternative); (ii) is absorbed in the diffuser jacket wall 50 or in the core 3; or (iii) is scattered by a diffuser particle 4 in the core 3 in a way that leads to its recapture by that light guide. Alternative (iii) simply returns the light to its previous condition and does not lead to any loss.

The only loss mechanism is absorption by the opaque reflecting diffuser jacket 50 or the core 3. However, the core 3 has very low absorption. Therefore, if the diffuser walls also have low absorption and high reflectance, light can undergo many interactions with the walls before it is absorbed. If light reaches an aperture 54 before it is absorbed then it will escape through that aperture. Consequently, with a highly reflective diffuser it is possible to direct a substantial fraction of the light escaping from the core 3 into the apertures. For a perfectly reflecting diffuser it is theoretically possible to couple nearly all of the light leaving the core 3 with the apertures by virtue of the mechanisms described above. This compares to a coupling efficiency of at best a few percent for absorbing coaxial jackets.

Note that the more important factor for increased output is the reflectivity of the diffuser rather than its degree of diffusion. A purely specular reflecting surface (i.e. a perfect mirror with no diffusing properties at all) would lead to increased output, but would suffer from the drawback that the exiting light would be strongly forward focused. The fact that the light undergoes many reflections off the diffuser surfaces means that even a low degree of diffusion at each interaction will lead to a relatively uniform angle distribution for the light exiting the apertures.

Viewed externally, the apertures emit bright light having a pleasing, substantially uniform appearance.

A variation is to surround one or more of the apertures of the opaque reflecting diffuser jacket 24 with a transmitting diffuser to further diffuse the light emitted through the apertures.

With reference to FIG. 6, the high surface brightness at the apertures 54 means that they can usefully serve as auxiliary light sources for optical elements 60 that focus and direct the light in preferred directions. FIG. 6 illustrates the use of refractive optical elements in the form of lenses for this purpose, but reflective optics, diffractive elements or combinations thereof are also suitable.

Figure 9:
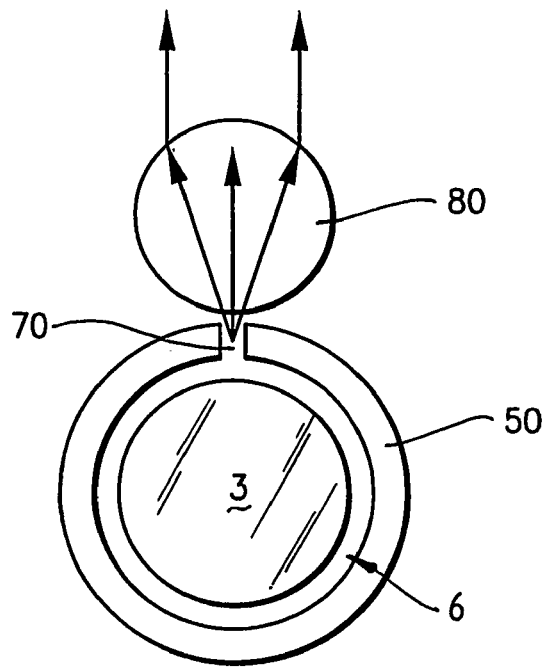
FIG. 9 is a transverse section through the light guide of FIG. 8.

In the example illustrated in FIG. 7, the apertured opaque reflecting diffuser jacket 50 has a narrow, longitudinally extending slit 70. The slit can serve as a narrow auxiliary linear light source, for example, for optical elements that focus and direct the light in preferred directions. That linear light source may be focused with essentially cylindrical optics 80, as shown in FIGS. 8 and 9. A useful application of the auxiliary linear light source is as a linear light source for edge-lit signs, displays and the like.

Note that in FIGS. 2 to 9, the core 3 is surrounded by a low refractive index sheath 6 of air. However, surrounding the core 3 with a with a low refractive index sheath 6 of a different low absorption material does not substantially change the results. Transparent PTFE is a preferred material for a sheath 6 not made of air.

Figure 10:
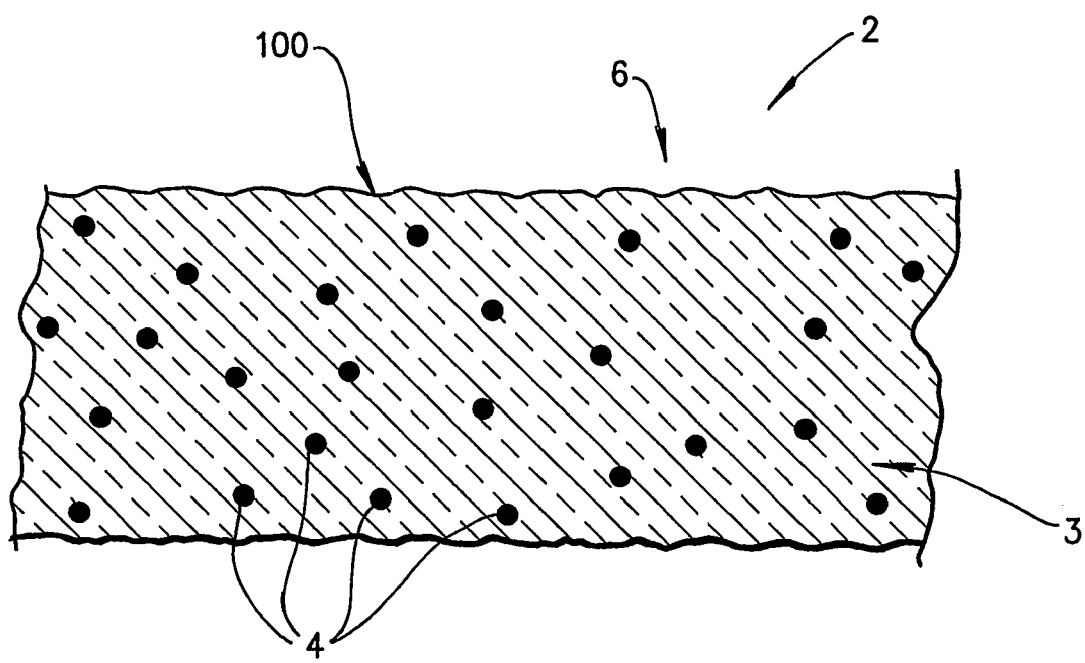
FIG. 10 is a section through a seventh side-scattering light guide.

The concentration of diffuser particles 4 in the core 3 may be selected to be as high as the order of $10^3$ particles per meter. The inventors have identified that with such a high concentration of diffuser particles in the polymer matrix, a core 3 produced by, for example, an extrusion process, comprises a rough outer surface 100, as shown in FIG. 10. The roughness in the outer surface is produced by the high concentration of diffuser particles 4 which modifies surface tension effects that would otherwise maintain a smooth surface.

In a further example, a PMMA rod was doped with diffuser particles at a linear diffuser particle frequency of approximately 1650 particles per meter. The rod is naturally surrounded by air that serves as the low refractive index sheath 6 of the light guide. The refractive index difference between the polymer matrix and the diffuser particles was approximately 1.1%. The rough surface 100 of the light guide acts as a translucent diffusing jacket producing bright light having a pleasing, substantially uniform appearance.

Since the rough surface is achieved in the core production process it is not necessary to employ mechanical or chemical roughening processes. However, additional roughening steps may be employed if desired.

Throughout the specification the aim has been to describe the invention without limiting the invention to any one example. Persons skilled in the relevant art may realize variations from the specific examples that will nonetheless fall within the scope of the invention.

The invention claimed is:

1. A side-scattering light guide, comprising:
   a transparent optically homogenous elongate core to transmit light along the core from end to end;
   an optically transmitting sheath, having a lower refractive index than the core, surrounding and in contact with the sides of the core;
   diffuser particles within the core, the diffuser particles being transparent, having a refractive index close to that of the core, high optical transmittance, low back reflectance and low absorbance, and being distributed to scatter light being transmitted along the core so that at least some of the scattered light exits the sides of the core; and, a jacket of diffusing material arranged to intercept scattered light exiting the sides of the core.

2. The side scattering light guide of claim 1, wherein the ratio of the diffuser particles' refractive index to that of the core varies by less than 1% over the light's wavelength range.

3. The side scattering light guide of claim 1, wherein the diffuser particles have a size substantially greater than the light's average wavelength.

4. The side-scattering light guide of claim 1, wherein the optically transmitting sheath surrounding said core is transparent or translucent.

5. The side-scattering light guide of claim 1, wherein an outer layer of the optically transmitting sheath forms the jacket of diffusing material.

6. The side-scattering light guide of claim 3, wherein the outer layer of the sheath is non-smooth.

7. The side-scattering light guide of claim 1, wherein a rough outer surface of the core forms the jacket of diffusing material.

8. The side-scattering light guide of claim 1 wherein the rough outer surface is produced by a high concentration of diffuser particles in the core.

9. The side-scattering light guide of claim 1, wherein the jacket of diffusing material surrounds only part of the core.

10. The side-scattering light guide of claim 1, wherein the jacket of diffusing material is a translucent diffuser.

11. The side-scattering light guide of claim 1 wherein the jacket of diffusing material is formed of one of polyethylene, PMMA, PTFE, ABS, PVC, or glass.

12. The side scattering light guide of claim 1, wherein the jacket of diffusing material is a reflecting diffuser.

13. The side-scattering light guide of claim 1, wherein the jacket of diffusing material is opaque and reflective.

14. The side-scattering light guide of claim 1, wherein the jacket of diffusing material is both transmitting and reflective.

15. The side-scattering light guide of claim 1, wherein parts of the jacket of diffusing material are transmitting, and other parts are reflective.

16. The side-scattering light guide of claim 1, wherein the jacket of diffusing material is apertured.

17. The side-scattering light guide of claim 16, wherein the apertures are surrounded by a transmitting diffuser.

18. The side-scattering light guide of claim 16, wherein the aperture is a longitudinal slit.

19. The side-scattering light guide of claim 1, wherein the diffuser particles are formed of polymeric material, glass or quartz.

20. The side-scattering light guide of claim 1, further comprising one or more optical elements adjacent a side of the light guide to collect and direct side-scattered light from said side-scattering light guide.

21. The side-scattering light of claim 20, wherein the optical element is a lens, a mirror or a diffractive element.

22. The side scattering light guide of claim 1, wherein the low refractive index sheath is formed of a flouropolymer or silicone polymer.

23. The side scattering light guide of claim 1, where the low refractive index sheath is formed of at least one of: polytetrafluorethylene (PTFE); copolymers of polytetrafluoroethene and hexafluoropropylene (FEE); and tetrafluorethylene-perfluoralkoxethylene copolymers (PFE); flurosilicone polymers; polydimethylsiloxane polymers; and polymethylphenylsiloxane polymers.

24. The side scattering light guide of claim 1, wherein the sheath is a volume of free space.

25. The side scattering light guide of claim 1, wherein the sheath is fluid.

* * * * *